United States Patent
Pennini et al.

(10) Patent No.: US 6,544,920 B1
(45) Date of Patent: Apr. 8, 2003

(54) COMPONENTS AND CATALYSTS FOR THE POLYMERIZATION OF OLEFINS

(75) Inventors: Gianni Pennini, Porotto (IT); Arrigo Arletti, Finale Emilia (IT); Giampiero Morini, Padua (IT)

(73) Assignee: Basell Poliolefine Italia S.p.A., Milan (IT)

( * ) Notice: Subject to any disclaimer, the term of this patent is extended or adjusted under 35 U.S.C. 154(b) by 585 days.

(21) Appl. No.: 08/894,423

(22) PCT Filed: Dec. 17, 1996

(86) PCT No.: PCT/EP96/05659

§ 371 (c)(1),
(2), (4) Date: Nov. 3, 1997

(87) PCT Pub. No.: WO97/23518

PCT Pub. Date: Jul. 3, 1997

(30) Foreign Application Priority Data

Dec. 21, 1995 (IT) .......................................... MI95A2716

(51) Int. Cl.[7] ................ C08F 4/64; C08F 4/02
(52) U.S. Cl. ................ 502/120; 502/111; 502/115; 502/116; 502/125; 502/126; 502/127; 502/132; 526/124.5; 526/124.6
(58) Field of Search ................ 502/111, 115, 502/116, 125, 120, 127, 126, 132; 526/124.5, 124.6

(56) References Cited

U.S. PATENT DOCUMENTS

| | | | | |
|---|---|---|---|---|
| 4,305,840 A | * | 12/1981 | Zucchini et al. | 252/429 |
| 4,410,451 A | * | 10/1983 | Dietz et al. | 502/110 |
| 4,855,271 A | | 8/1989 | McDaniel et al. | 502/107 |
| 5,219,961 A | * | 6/1993 | Zucchini et al. | 526/125 |
| 5,244,854 A | | 9/1993 | Noristi et al. | 502/120 |
| 5,578,540 A | * | 11/1996 | Banzi et al. | 502/115 |

FOREIGN PATENT DOCUMENTS

| | | |
|---|---|---|
| EP | 0 274 099 A2 | 7/1988 |
| GB | 2 028 347 A | 3/1980 |

* cited by examiner

*Primary Examiner*—Caixia Lu

(57) ABSTRACT

Solid catalyst component for the polymerization of olefins, includes the product of the direct reaction, with no subsequent reactions with reducing organometallic compounds, between a titanium compound and a support obtained by contacting a metal oxide containing hydroxyl groups with a solution containing A) a magnesium chloride; B) from 1 to 6 moles of an alcohol per mole of magnesium chloride, in a halogenated hydrocarbon or aromatic hydrocarbon organic solvent C) capable of bringing the magnesium chloride in solution in quantities greater than or equal to 5 grams per liter in the presence of the above-mentioned quantities of alcohol B), the solvent not being able to form adducts with the magnesium chloride.

11 Claims, No Drawings

COMPONENTS AND CATALYSTS FOR THE POLYMERIZATION OF OLEFINS

This application is a U.S. National Stage of International application PCT/EP96/05659, filed Dec. 17, 1996, and published on Jul. 3, 1997 in the English Language.

The present invention concerns solid catalyst components comprising magnesium chloride and a titanium compound supported on metal oxides, and catalysts obtained from them.

Said components and catalysts find a particular application in the polymerization of $CH_2$=CHR α-olefins where R is hydrogen or an alkyl radical with 1–6 carbon atoms, or an aryl radical, in particular a phenyl radical.

In the art are known and described many examples of solid components and catalysts of the above mentioned type obtained by way of various preparation methods.

The interest in developing catalysts where the magnesium chloride and the titanium are supported on metal oxides is due to the many advantages that said catalysts offer, such as:

reduction in the content of halogens in the polymer obtained with said catalysts, due to their reduced content of halogens compared to the catalysts comprising a component supported on magnesium chloride;

simplicity in the preparation;

the availability in the market of metal oxides adequate for the preparation of the catalysts.

Obviously said reduction in the content of halogens is greater as the yield of the polymerization of the catalyst increases.

However, the catalysts comprising a component supported on magnesium chloride, and therefore not containing metal oxides, allow one to obtain polymers having higher bulk density compared to the catalysts having the magnesium chloride and the titanium compound supported on metal oxides.

For example, published European patent application n. 506074 describes catalysts supported on metal oxides that allow one to obtain high yields in the polymerization of olefins, however the examples show that the polymer obtained has a tamped bulk density which does not exceed 0.46 g/cm$^3$.

Therefore, it would be particularly desirable to obtain a catalyst supported on metal oxides that would be capable of producing, with high yields, polymers having a higher bulk density.

In fact, a higher bulk density facilitates the conveying and processing of the polymers, and allows the polymerization plants to maintain high levels of productivity, particularly in liquid polymer.

SUMMARY OF THE INVENTION

As an answer to this need, the Petitioner realized a solid catalyst component for the polymerization of olefins, which constitutes one object of the present invention, comprising the product of the direct reaction, with no subsequent reactions with reducing organometallic compounds, between a titanium compound containing at least one Ti-halogen bond, optionally an electron-donor compound, and a support obtained by contacting a metal oxide containing hydroxyl groups with a solution comprising:

A) magnesium chloride;

B) an alcohol in quantities ranging from 1 to 6 moles, preferably from 2 to 4 moles, per mole of magnesium chloride, in an organic solvent capable of bringing the magnesium chloride in solution in quantities greater than or equal to 5 g per liter, preferably greater than or equal to 10 g per liter in the presence of the above mentioned quantities of alcohol B), said solvent, however, not being able to form adducts with the magnesium chloride.

DETAILED DESCRIPTION OF THE PREFERRED EMBODIMENTS

The catalysts obtained from the above mentioned solid component are capable of producing polyolefins in free-flowing particles having a tamped bulk density even higher than 0.5 g/cm$^3$.

Moreover, said polyolefins contain a particularly small fraction of fine particles (i.e., having a diameter smaller than or equal to 500 μm), generally less that 1% by weight, while the micro-fines (i.e., polymer particles with a diameter smaller than 106 μm) are substantially absent. Said characteristic constitutes a further advantage, because low contents of fine particles contribute to facilitate the conveying and processing of the polymers. In addition, the absence of micro-fines contributes to the elimination of fouling and plugging phenomena in the polymerization plants and in the polymer conveyance plants.

A further advantage of the catalyst components of the present invention is the extreme simplicity of the process used for their preparation.

In fact there is no need for any physical or chemical treatment of the metal oxide before it is contacted with the solution of magnesium chloride and alcohol B) in solvent C). Moreover the reaction with the titanium compound containing at least one Ti-halogen bond is carried out by adding said titanium compound to the suspension of metal oxide in the solvent C), resulting from the contact with the above mentioned solution, or after removing the solvent C) from the suspension, preferably by evaporation. The reaction with the electron-donor compound, when used, may occur before, during or after the reaction with the titanium compound. The reactions with the titanium compound and the electron-donor compound, therefore, occur directly, without treatments or intermediate reactions after the contact between the metal oxide and the solution of A)and B) in C), other than the removal of C) and partial removal of B) (both being optional), and without further reactions with reducing organometallic compounds.

Said preparation process is particularly simplified compared to the process described in published European patent application n. 408 750, which requires the use of solutions of magnesium chloride and alcohols in organic solvents, but needs to carry out the following steps:

treatment of the metal oxide, before the contact with the above mentioned solutions, with an organometallic compound of the groups from II to IIIA of the periodic table, or with a halogenated compound;

treatment of the product of the contact with the above mentioned solutions, either before, during or after the reaction with a titanium compound, with a reducing organometallic compound.

In addition, in all of the examples of the above mentioned European patent application, the metal oxide is previously subjected to heat treatments. The same examples show that in spite of the complexity of the catalyst preparation process, the polymer obtained from it has relatively low bulk density values. Moreover, the above mentioned catalyst is suitable only for the polymerization and copolymerization of ethylene, while the catalyst of the present invention is capable of producing highly isotactic polypropylene with all the advantages described above.

Particularly preferred among the metal oxides that can be used in the preparation of the solid catalyst component of the present invention are the silica, alumina, the mixed Al and Si oxides, magnesium oxide, and titanium dioxide.

As already stated, the metal oxides are not subjected to physical or chemical treatments before being contacted with the magnesium chloride solution, therefore they contain hydroxyl groups in quantities generally ranging from 1 to 3 mmoles per gram.

Preferably they contain also free water, i.e., water that is not chemically bonded but is only absorbed into the metal oxide, in quantities generally up to 15 mmoles per gram, in particular ranging from 0.1 to 15 mmoles per gram. The determination of the quantity of hydroxyls can be made according to the method described in J. Phys. Chem. 66 800 (1962), and that of the free water by way of the Fisher reagent.

Preferably the metal oxides have a pore volume (B.E.T.) greater than 0.3 cm$^3$/g, and generally ranging from 0.5 to 3.5 cm$^3$/g, while the surface area (B.E.T.) of said oxides can vary within rather wide limits, for example from 30 to 1000 m$^2$/g, preferably from 200 to 500 m$^2$/g.

Examples of solvents C) are aromatic hydrocarbons, and aliphatic, cycloaliphatic, or aromatic halogenated hydrocarbons. The preferred ones are the halogenated hydrocarbons, in particular the aliphatic or cycloaliphatic chlorinated or brominated hydrocarbons, either saturated or unsaturated, or aromatic hydrocarbons, containing 5–20, more preferably 6–12 carbon atoms.

Specific examples of aromatic hydrocarbons are: benzene; toluene; xylene; ethylbenzene; isopropylbenzene. Specific examples of halogenated hydrocarbons are: $CH_2Cl_2$; $CHCl_3$; $CCl_4$; $CHCl_2Br$; i.-$C_3H_7Cl$; n.-$C_4H_9Cl$; $CH_2Cl—CH_2Cl$; $CHCl=CCl_2$; $CH_2ClCHCl_2$; $C_6H_{11}Cl$; $C_6H_{10}Cl_2$; $C_6H_5Cl$; $C_6H_5Br$; $C_6H_4Cl_2$; $C_6H_5CH_2Cl$; $ClC_6H_4CH_2Cl$; $C_6H_5CCl_3$; $CH_2Cl—CHCl—CH_2Cl$; $CH_2=CHCH_2Cl$; $CH_3C_6H_4Cl$.

Preferred examples of alcohols B) are the $C_1$–$C_{25}$ aliphatic, saturated or unsaturated, $C_3$–$C_{25}$ cycloaliphatic, saturated or unsaturated, and $C_6$–$C_{25}$ aromatic mono- and dialcohols (i.e., containing one or two hydroxyl groups), said mono or dialcohols optionally containing one or more halogen atoms, in particular chlorine and bromine.

Specific examples of alcohols B) are: $CH_3OH$; $C_2H_5OH$; i.-$C_3H_7OH$; n.-$C_4H_9OH$; i.-$C_4H_9OH$; $CH_2OH—CH_2OH$; HO—$(CH_2)_3$—OH; OH—$(CH_2)_{12}$—OH; $ClCH_2CH_2OH$; $CL_3CCH_2OH$; $C_6H_5OH$; $CH_3$–$C_6H_4OH$; $C_6H_5$—$CH_2OH$; $C_6H_{11}OH$; $C_6H_{10}(OH)_2$; $C_{16}H_{33}OH$; $C_{10}H_{20}(OH)_2$; $CH_2=CH—CH_2OH$; $CH_2=CH—CH_2—CH_2OH$; $ClC_6H_{10}OH$; $ClC_6H_4OH$; $C_{12}H_{23}$—$C_6H_4OH$.

The magnesium chloride and alcohol B) solution in solvent C) is obtained by mixing together the above mentioned components, which can be added in any order, and optionally heating until the magnesium chloride is completely dissolved.

At the same time or after the preparation of the above mentioned solution, one adds the metal oxide, which is preferably maintained in contact with the solution at ambient temperature or higher, for a period of time ranging from 10 to 120 minutes.

Preferably the concentration of magnesium in the solution is comprised from 0.05 to 1 moles/liter, more preferably from 0.2 to 0.5 moles/liter, while the metal oxide is added to the solution in quantities preferably ranging from 10 to 200 g/l, more preferably from 50 to 150 g/l.

The product of the contact of the metal oxide with the magnesium chloride and alcohol B) solution in solvent C) is then caused to react with the titanium compound, preferably after solvent C) has been removed by evaporation.

The evaporation of solvent C) can be carried out in a rotating evaporator for example.

Generally one operates under temperature and pressure conditions that cause a substantially total evaporation of solvent C), and optionally a partial removal of alcohol B). Preferably the operation takes place at reduced pressure. The titanium compound is normally used in excess with respect to the moles of alcohol B) present in the solution or in the solid product resulting from the removal of solvent C). Preferably the titanium compound is titanium tetrachloride. In this case the reaction is preferably carried out using said tetrachloride as the reaction medium after solvent C) is removed. The operation takes place at temperatures ranging from 0° C. and 135° C. for a period of time ranging from 0.25 to 1 hour or more. After the reaction, the excess $TiCl_4$ is removed hot, and the solid is repeatedly washed with a hydrocarbon (such as hexane, for example) until all the chlorine ions have disappeared. It is advantageous to repeat the treatment with $TiCl_4$ one or more times, and wash the solid as indicated above.

As previously stated, the reaction with the electron-donor can be carried out at the same time as the one with the titanium compound. In the case of $TiCl_4$, the electron-donor compound is dissolved or suspended in the excess $TiCl_4$, and the solution or suspension is caused to react with the metal oxide. The quantity of electron-donor compound used preferably ranges from 0.1 to 1.5 moles per g-atom of Mg, more preferably from 0.2 to 0.4 moles.

The electron donor compound can also be caused to react before or after the reaction with the titanium compound besides during the reaction with the titanium compound. In the case where it is caused to react afterwards, it is best if the reaction takes place in an aromatic hydrocarbon medium such as benzene or toluene, and the quantity of electron-donor compound be equimolar with the titanium compound fixed on the metal oxide.

The best results, however, are obtained by reacting the electron-donor compound at the same time as the titanium compound.

Other titanium compounds that are suitable for use besides the titanium tetrachloride, are the halogen alcoholates, such as $TiCl_3OR$, where R is a phenyl radical for example, and the trihalides, particularly the $TiCl_3$.

For the catalyst components to be used in the stereoregular polymerization of α-olefins, particularly for the production of highly isotactic polypropylene, it is preferable to use tetravalent titanium compounds.

Given the absence of treatments with the reducing organometallic compounds in the preparation process of the catalyst component of the present invention, the titanium present in said catalyst component can be maintained at a state which is substantially tetravent.

Any electron-donor compounds capable of forming complexes with the magnesium halides and/or the titanium compounds can be used for the preparation of the catalyst component. Examples of compounds that can be used are the ethers, esters, ketones, lactones, and compounds containing N, P, and/or S atoms. Preferred compounds are the dicarboxyl aromatic acid esters, such as phthalic acid, and malonic, pivalic, succinic, and carbonic acid esters.

Particularly suited are also the ethers described in published European patent application n. 361494 having the formula:

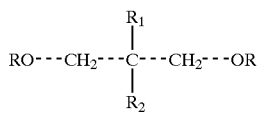

where R, $R_1$, and $R_2$, equal or different, are linear or branched $C_1$–$C_{18}$ alkyl groups, $C_3$–$C_{18}$ cycloalkyl groups or $C_6$–$C_{18}$ aryl, alkaryl or aralkyl groups, and $R_1$ or $R_2$ can also be hydrogen. In particular, R is methyl and $R_1$ and $R_2$, equal or different, are ethyl, propyl, isopropyl, butyl, isobutyl, tert-butyl, neopentyl, isopentyl, phenyl, benzyl, or cyclohexyl.

Specific esters are diisobutyl, dioctyl and diphenyl phthalate, benzyl-butyl phthalate, diisobutyl and diethyl malonate, ethyl pivalate, ethyl-phenyl carbonate, diphenyl carbonate.

Typical ethers are 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2,2-bis(cyclohexyl)-1,3-dimethoxypropane.

In the supports (after the contact with the magnesium chloride solution) the Mg content preferably ranges from 0.5 to 20% by weight; in the catalyst components the Mg/Ti ratio preferably ranges from 0.5 to 8.

The electron-donor compound is preferably present in molar ratios to the magnesium ranging from 0.1 to 0.5, in particular from 0.2 to 0.35. The total quantity of magnesium halide, titanium halide or halogen alcoholate and electron-donor present in the catalyst component ranges preferably from about 5 to 60% by weight.

The catalyst components form, with Al-alkyl compounds, preferably with Al-trialkyl, catalysts which are suited for the polymerization of $CH_2$=CHR α-olefins where R is a hydrogen or an alkyl radical with 1–6 carbon atoms, or an aryl radical, and mixtures thereof optionally containing minor proportions of a diene.

Representative Al-alkyl compounds are Al-triethyl, Altriisobutyl, Al-tri-n-butyl, and linear or cyclic compounds containing two or more Al atoms bridge-bonded by way of O or N atoms, or $SO_4$ and $SO_3$ groups.

The Al-alkyl compound is generally used in an Al/Ti ratio ranging from 1 to 1000.

In order to improve the stereospecificity of the catalyst, in many cases it is preferable to use an electron-donor compound, together with the Al-alkyl compound, in quantities ranging preferably from 0.01 to 0.25 moles per mole of Al-alkyl compound.

The electron-donor compound is selected preferably from the ethers, esters, silicon compounds containing at least one Si—OR bond (where R is a hydrocarbon radical, in particular $C_1$–$C_{20}$ alkyl, $C_3$–$C_{20}$ cycloalkyl, $C_6$–$C_{20}$ aryl, arylalkyl or alkaryl), and 2,2,6,6-tetramethylpiperidine When the solid catalyst component comprises an ester of dicarboxylic aromatic acid, such as phthalic acid, or an ester of malonic, maleic, pivalic, succinic, or carbonic acid, the electron-donor compound to be used together with the Al-alkyl compound is selected preferably from the silicon compounds containing at least one Si—OR bond. Examples of said compound are phenyltriethoxysilane, diphenyldimethoxysilane, dicyclopentyl-dimetoxysilane, methyl, tert-butyl-dimethoxysilane, methylcycloexyldimethoxysilane.

When in the catalyst component is present an ether selected from those described in published European patent application N. 361494, the stereospecificity of the catalyst is sufficiently high, therefore there is no need to use the electron-donor compound together with the Al-alkyl compound.

The polymerization of olefins is carried out according to known methods, operating in liquid phase, in liquid monomer or in a solution of the monomer in an inert hydrocarbon solvent, or in gas phase, or also by combining polymerization stages in liquid and gas phases.

The polymerization temperature generally ranges from 0° to 150° C., preferably from 60° to 100° C. The operation takes place at atmospheric pressure or higher.

The catalysts are used for homopolymerization as well as copolymerization of olefins. In the case of copolymers, they are used for the preparation, for example, of random crystalline copolymers of propylene with minor proportions of ethylene and optionally of butene and superior α-olefins, or elastomeric copolymers of ethylene with propylene optionally containing minor proportions of a diene (butadiene, 1,4-hexadiene).

In addition, the catalysts can be used in the sequential polymerization of propylene, as well as mixtures of propylene with ethylene and/or butene and superior α-olefins, to form impact grade polypropylene.

Prior to polymerization, the catalysts can be precontacted with small quantities of olefins (prepolymerization) operating either in suspension in a hydrocarbon solvent (such as hexane or heptane), and polymerizing at temperatures ranging from ambient to 60° C. thus producing quantities of polymer ranging from 0.5 to 3 times the weight of the solid catalyst component, or operating in liquid monomer, thus producing quantities of polymer up to 1000 g per g of solid component.

The following examples are given in order to illustrate the invention.

EXAMPLES

The properties of the polymers in the examples are determined with the following methods:

| PROPERTY | METHOD |
|---|---|
| Melt Flow Rate (MFR) | ASTM D 1238L |
| Insoluble in xylene at 25° C. | 2.5 grams of polymer are dissolved in 250 ml of xylene at 135° C. while stirring, and after 20 minutes the content is allowed to cool to 25° C. After 30 minutes the precipitated polymer is filtered and dried at reduced pressure at 80° C. until it reaches constant weight. |
| Tamped Bulk Density | ASTM D-1985 |
| Particle size distribution | ASTM D 1921 |

Example 1

Preparation of the Support

In a 1 liter reactor under agitation, in nitrogen atmosphere, are introduced 660 ml of 1,2-dichloroethane, 24.0 g of anhydrous $MgCl_2$, and 58 ml of ethanol. The content is heated to the boiling point until the solution is completed.

300 ml of the solution thus obtained, containing 0.15 moles of $MgCl_2$, are introduced into a slurry formed by 50 g of SG 332 silica gel, produced by GRACE, and 200 ml of 1,2-dichloroethane, which is placed in a rotating evaporator. After 30 minutes at ambient temperature the content is evaporated under vacuum at 50° C. In this manner the support is obtained in the form of a highly free-flowing powder having the following composition (percentages by weight):

4.3% of Mg;

12.55% of Cl;

22.0% of ethanol.

The silica used in the preparation of the support contains 2.2 moles of $H_2O$ per gram, measured with the analytic method mentioned above. Moreover, the porosity and surface area of the above silica are 2.05 $cm^3/g$ and 331 $m^2/g$ respectively when measured by way of the B.E.T. method, and 2.81 $cm^3/g$ and 293 $m^2/g$ when measured with a mercury porosimeter.

The porosity of the support, measured by way of the B.E.T. method, is 0.806 $cm^3/g$, with a surface area of 180.7 $m^2/g$; when measured with a mercury porosimeter it is 1.029 $cm^3/g$ with a surface area of 133.7 $m^2/g$.

Preparation of the Catalyst Component

In nitrogen atmosphere 30.0 g of the above mentioned support are added to 800 ml of $TiCl_4$, while under agitation and at ambient temperature, in a 1 liter reactor. During the period of one hour the content is heated to 100° C.; when the temperature reaches 60° C., 3.6 ml of dibutyl phthalate are added.

The content is maintained at 100° C. for 2 hours, and then, after sedimentation of the solid and syphoning of the liquid, 800 ml of $TiCl_4$ are added, and it is heated to 120° C. for one hour. The solid obtained after sedimentation and syphoning of the liquid is washed with hexane at 60° C. until all the chlorine ions disappear from the wash liquid. A portion of the slurry of the catalyst component is used for the polymerization test; the remaining solid after drying contains (percentages by weight):

4.5% of Ti;

4.7% of Mg;

21.9% of Cl;

1.9% of dibutyl phthalate;

0.5% of hexane.

Propylene Polymerization

In a 4 liter stainless steel autoclave equipped with agitator and purged with nitrogen flow for one hour, are introduced, in propylene flow at 30° C., 80 ml of anhydrous hexane containing 0.25 ml or slurry of the catalyst component prepared as described above, 6.66 mM of $AlEt_3$, and 0.333 mM of cyclohexylmethyldimethoxysilane. The autoclave is closed and 1 Nl of hydrogen and, while stirring, 1.2 Kg of propylene are introduced.

The content is heated to 70° C. in 5 minutes, and is polymerized for 2 hours.

At the end the nonreacted propylene is removed, the polymer is recovered and dried at 70° C. in an oven in nitrogen flow for 3 hours, and then it is characterized.

470 g of polymer in powder form are obtained, said polymer having the following characteristics:

residual Mg content 3.8 ppm (from which, based on the composition of the catalyst, a yield of 12.4 kg of polymer/g of catalyst is calculated)

MFR: 8.8g/10 minutes insoluble in xylene at 25° C.: 97.4% tamped bulk density: 0.48 $g/cm^3$ particle size distribution (percentages by weight):
fraction of particles with a diameter >4000 µm: 0.1%
fraction of particles with a diameter <500 µm: 0.0%
fraction of particles with a diameter <106 µm: 0.0%

The polymer powder is also highly free-flowing.

Example 2

Preparation of the Catalyst Component 15.0 g of the support described in Example 1 are used. The synthesis of the catalyst is carried out as in Example 1, but using, instead of the dibutyl phthalate, 2-isopropyl-2-isopentyl-1,3-dimethoxypropane in quantity 1/3 molar with respect to the magnesium.

The analysis of the catalyst component thus obtained shows the following results (percentages by weight):

4.66% of Ti 4.35% of Mg 19.8% of Cl 4.1% of 2-isopropyl-2-isopentyl-1,3-dimethoxypropane 4.6% of hexane.

Propylene Polymerization

The procedure is the same as in Example 1 using 0.20 ml of the slurry of the catalyst component but without using cyclohexylmethyl dimethoxysilane.

465 g of polymer are obtained, said polymer having the following properties:

Mg content 1.9 ppm (a yield of 24.0 Kg of polymer/g of catalyst is calculated)

MFR: 4.0 g/10 minutes insoluble in xylene at 25° C.: 97.5% tamped bulk density: 0.49 $g/cm^3$ particle size distribution (percentages by weight):
fraction of particles with a diameter >4000 µm: 0.2%
fraction of particles with a diameter <500 µm: 0.4%
fraction of particles with a diameter <106 µm: 0.0%

The polymer powder is highly free-flowing.

Example 3

Preparation of the Support

The procedure is the same as in Example 1, but using, instead of ethanol, the same number of moles of butanol.

A highly free-flowing, regular, granular product is obtained with the following composition (percentages by weight):

3.4% of Mg 10.35% of Cl 34.5% of butanol

Preparation of the Catalyst Component

The procedure is the same as in Example 1, but instead of the dibutyl phthalate di-isobutyl-phthalate (Mg/di-isobutyl phthalate=4 molar) is used.

The catalyst component thus obtained has the following composition (percentages by weight):

4.6% of Ti 4.45% of Mg 22.05% of Cl 4.7% of di-isobutylphthalate 5.6% of hexane.

Propylene Polymerization

The procedure is the same as in Example 1, feeding 0.25 ml of the slurry of the catalyst component prepared as described above.

330 g of powder polymer are obtained, said polymer having the following characteristics:

residual Mg: 3.6 ppm (from which a yield of 13.1 kg of polymer/g of catalyst is calculated)

MFR: 2.6 g/10 minutes insoluble in xylene at 25° C.: 97.1%
tamped bulk density: 0.51 g/cm³
particle size distribution (percentages by weight):
   fraction of particles with a diameter >4000 μm: 0.2%
   fraction of particles with a diameter <500 μm: 0.9%
   fraction of particles with a diameter <106 μm: 0.0%

Comparative Example 1

Preparation of the Support 47.7 g of anhydrous $MgCl_2$ are added to 873 ml of absolute ethanol at ambient temperature while stirring. The slurry is heated to the boiling point thus obtaining a solution. 246 g of the solution thus prepared, containing 0.166 M of MgCl2, are added to a slurry made of 50 g of silica of the same type as the one used for Example 1, and 200 ml of ethanol.

The slurry thus obtained is maintained at ambient temperature for 30 minutes while stirring.

It is then evaporated and dried at 50° C. under vacuum in a rotating evaporator. During this operation a part of the product tends to adhere to the walls of the apparatus, and must be removed mechanically.

The support thus obtained has the following composition (percentages by weight) and porosity:
2.65% of Mg
7.5% of Cl
64.0% of ethanol.
Porosity: B.E.T. method: 0.366 cm³/g (surface area: 58.9 m²/g)
   mercury porosimeter: 0.377 cm³/g (surface area: 13.9 m2/g).

Preparation of the Catalyst Component

The procedure is the same as in Example 1 with a Mg/dibutyl phthalate ratio=4 molar.

One obtains a catalyst component having the following composition (percentages by weight):
4.5% of Ti
4.95% of Mg
22.2% of Cl
1.7% of dibutyl phthalate
5.7% of hexane.

Propylene Polymerization

The procedure is the same as for Example 1, feeding 0.30 ml of slurry of the catalyst component.

305 g of powder polymer are obtained, having the following characteristics:
   residual Mg: 3.8 ppm (from which a yield of 13.8 kg of polymer/g of catalyst is calculated)
   MFR: 4.8 g/10 minutes
   insoluble in xylene at 25° C.: 97.2%
   tamped bulk density: 0.46 g/cm³
   particle size distribution (percentages by weight):
      fraction of particles with a diameter >4000 μm: 0.3%
      fraction of particles with a diameter <500 μm: 4.1%
      fraction of particles with a diameter <106 μm: 0.2%

Comparative Example 2

Synthesis of the Support

The procedure is the same as in Example 1, but with a quantity of ethanol which is double that of the $MgCl_2$ used, thus obtaining a powder with little flowability having the following composition (percentages by weight) and porosity:
3.2% of Mg
10.35% of Cl
33.2% of ethanol.
Porosity: B.E.T. method: 0.913 cm³/g (surface area: 101 m²/g)
   mercury porosimeter: 1.87 cm³/g (surface area: 107 m²/g).

Preparation of the Catalyst Component

The procedure is the same as for Example 1, with the Mg/dibutyl phthalate=4 molar.

The catalyst component thus obtained has the following composition (percentagees by wieght):
4.8% of Ti
3.95% of Mg
20.0% of Cl
1.7% of dibutylphthalate
3.8% of hexane.

Propylene Polymerization

The test is conducted in the same manner as in Example 1, feeding 0.25 ml of the slurry of the catalyst component.

The polymer obtained (300 g), has the following characteristics:
   residual Mg content 3.4 ppm (calculated yield of 12.1 kg of polymer/g of catalyst)
   MFR: 3.5 g/10 minutes
   insoluble in xylene at 25° C.: 97.3%
   the product is full of flakes and coarse clusters, to the point that a correct determination of the particle size distribution and the tamped bulk density is impossible.

What is claimed is:
1. Solid catalyst component for the polymerization of olefins, comprising the product of the direct reaction, with no subsequent reactions with reducing organometallic compounds, between a titanium compound containing at least one Ti-halogen bond, optionally an electron-donor compound, and a support obtained by contacting a metal oxide containing hydroxyl groups with a solution comprising:
   A) magnesium chloride;
   B) an alcohol in quantities ranging from 1 to 6 moles per mole of magnesium chloride,
      in an organic solvent C) which is a halogenated hydrocarbon, the organic solvent being capable of bringing the magnesium chloride in solution in quantities greater than or equal to 5 g per liter in the presence of the above mentioned quantities of alcohol B), said solvent not being able to form adducts with the magnesium chloride,
      wherein said organic solvent (C) is selected from the group consisting of dichloromethane, trichloromethane, carbon tetrachloride, dichlorobromomethane, isopropylchloride, N-butylchloride, 1,2-dichloroethane, trichloroethene, trichloroethane, chlorocyclohexane, dichlorocyclohexane, chlorobenzene, bromobenzene, dichlorobenzene, benzylchloride, chlorobenzylchloride, benzyltrichloride, 1,2,3-trichloropropane, 3-chloropropene, and chlorotoluene.

2. The solid catalyst component of claim 1, where the metal oxide used for the preparation of the support contains, besides the hydroxyl groups, also chemically not combined water in quantities up to 15 mmoles per gram of oxide.

3. The solid catalyst component of claim 1 or 2, where the titanium is substantially tetravalent.

4. The solid catalyst component of claim 1, where the metal oxide is selected from silica, alumina, mixed Al and Si oxides, magnesium oxide and titanium dioxide.

5. The solid catalyst component of claim 1, containing an electron-donor selected from the ethers having the formula:

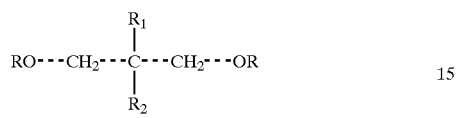

where R, $R_1$, and $R_2$, equal or different, are linear or branched $C_1$–$C_{18}$ alkyl groups, $C_3$–$C_{18}$ cycloalkyl groups, or $C_6$–$C_{18}$ aryl, alkaryl or aralkyl groups, and $R_1$ or $R_2$ can also be hydrogen.

6. The solid catalyst component of claim 1, containing an electron-donor compound selected from the phthalic acid esters.

7. Catalyst for the polymerization of α-olefins, comprising the product of the reaction of a solid catalyst component as defined in claim 1, with an Al-alkyl compound.

8. The catalyst of claim 7, comprising the product of the reaction of a solid catalyst component as defined in claim 1, with an Al-alkyl compound and a silicon compound containing at least one Si—OR bond, where R is a hydrocarbon radical.

9. Process for the preparation of the solid catalyst component of claim 1, comprising the direct reaction, with no subsequent reactions with reducing organometallic compounds, between a titanium compound containing at least one Ti-halogen bond, optionally an electron donor compound, and a support obtained by contacting a metal oxide containing hydroxyl groups with a solution comprising:

A) magnesium chloride;

B) an alcohol in quantities ranging from 1 to 6 moles per mole of magnesium chloride, in an organic solvent C) which is a halogenated hydrocarbon, the organic solvent being capable of bringing the magnesium chloride in solution in quantities greater than or equal to 5 g per liter in the presence of the above mentioned quantities of alcohol B), said solvent not being able to form adducts with the magnesium chloride.

10. Process for the polymerization of $CH_2$=CHR α-olefins where R is hydrogen or an alkyl radical with 1–6 carbon atoms, or an aryl radical, in the presence of the catalyst of claim 7.

11. The solid catalyst component of claim 1, wherein said alcohol is present in an amount of from 2–4 moles per mole of magnesium chloride.

* * * * *